United States Patent [19]

Mizuno et al.

[11] Patent Number: 5,671,410
[45] Date of Patent: Sep. 23, 1997

[54] DATA STORING DEVICE HAVING A CAPACITY DETERMINING SYSTEM

[75] Inventors: Masahiro Mizuno; Masao Futamura; Yukiyoshi Muto, all of Nagoya, Japan

[73] Assignee: Brother Kogyo Kabushiki Kaisha, Nagoya, Japan

[21] Appl. No.: 417,889

[22] Filed: Apr. 6, 1995

[30] Foreign Application Priority Data

Jun. 8, 1994 [JP] Japan .................................. 6-126031

[51] Int. Cl.$^6$ ................................................... G06F 19/00
[52] U.S. Cl. ..................... 395/615; 395/622; 112/470.02
[58] Field of Search ................................. 395/600, 425, 395/615, 622; 364/470; 112/121.12, 470.02

[56] References Cited

U.S. PATENT DOCUMENTS

| | | | |
|---|---|---|---|
| 4,388,883 | 6/1983 | Hirota et al. | 112/121.12 |
| 4,849,902 | 7/1989 | Yokoe et al. | 364/470 |
| 4,898,059 | 2/1990 | Iizuka | 84/601 |
| 4,982,674 | 1/1991 | Hayakawa | 112/121.12 |
| 5,193,171 | 3/1993 | Shinmura et al. | 395/425 |
| 5,193,184 | 3/1993 | Belsan et al. | 395/600 |
| 5,218,916 | 6/1993 | Kurono et al. | 112/121.12 |
| 5,255,198 | 10/1993 | Yokoe et al. | 364/470 |
| 5,255,620 | 10/1993 | Sasano et al. | 112/121.12 |
| 5,283,748 | 2/1994 | Muramatsu | 364/470 |
| 5,319,566 | 6/1994 | Kongho et al. | 364/470 |
| 5,345,584 | 9/1994 | Hill | 395/600 |
| 5,379,707 | 1/1995 | Asano | 112/121.12 |
| 5,481,992 | 1/1996 | Fujimura | 112/102.5 |
| 5,506,986 | 4/1996 | Healy | 395/600 |
| 5,522,067 | 5/1996 | Swire | 395/600 |
| 5,558,032 | 9/1996 | Muto et al. | 112/102.5 |
| 5,563,795 | 10/1996 | Futamura et al. | 364/470.09 |
| 5,592,891 | 1/1997 | Muto | 112/475.19 |

*Primary Examiner*—Thomas G. Black
*Assistant Examiner*—Jean M. Corrielus
*Attorney, Agent, or Firm*—Oliff & Berridge

[57] ABSTRACT

The data producing apparatus for producing a produced data set displays data sizes of one or more sets of previously stored data stored in the memory of the stitch data producing apparatus and a shortage capacity. Based on the size of the shortage capacity, the data producing apparatus automatically identifies a smallest one of the sets of previously stored data which can be erased to allow for storing the produced data set. The set of the previously stored data can alternately or also be selected based on ages of the previously stored data sets and/or the frequency of use of the previously stored data sets.

25 Claims, 5 Drawing Sheets

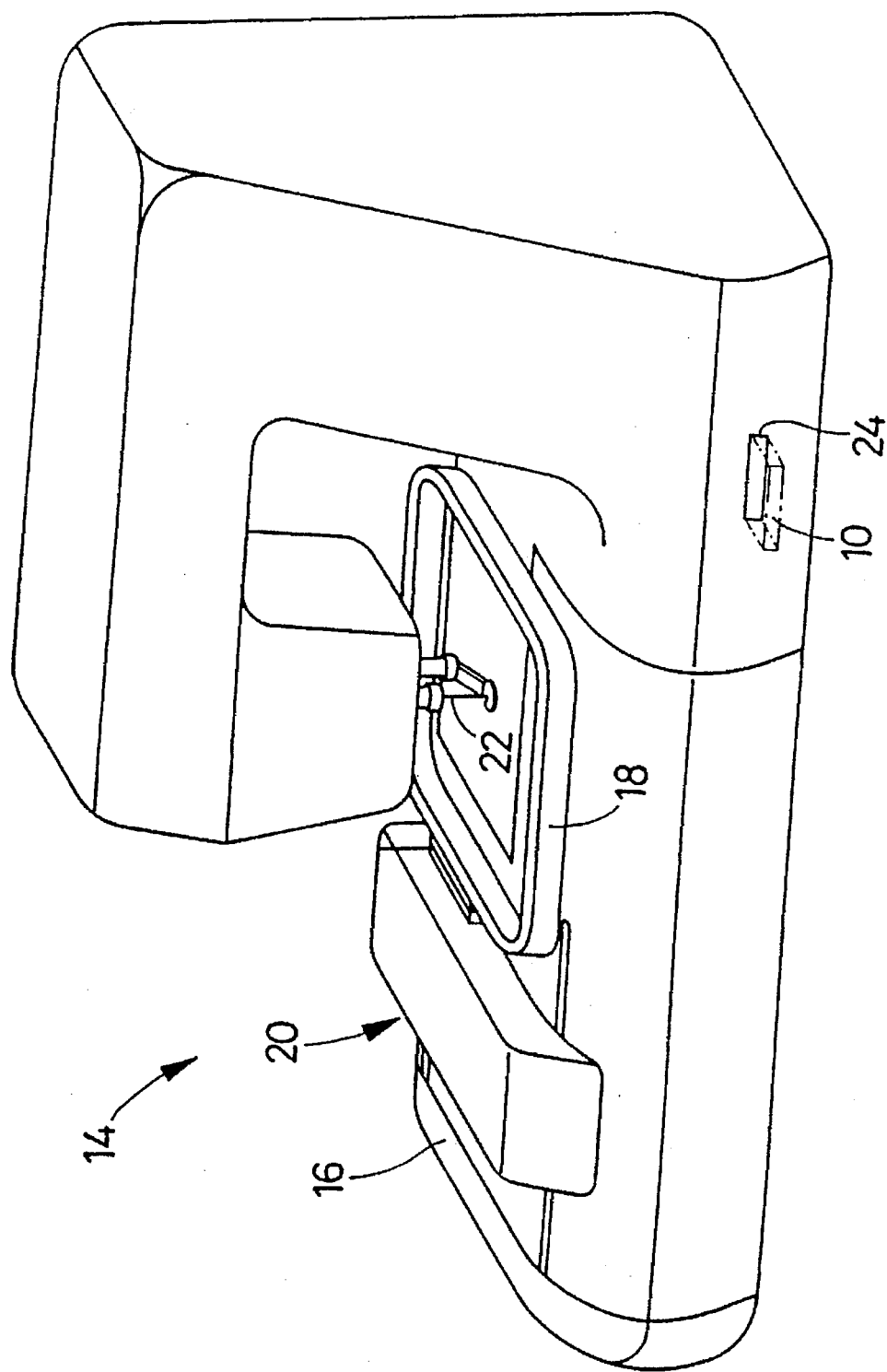

DATA STORING DEVICE HAVING A CAPACITY DETERMINING SYSTEM

BACKGROUND OF THE INVENTION

1. Field of the Invention

The present invention relates generally to a data storing device and, more specifically, to a data storing device incorporated into a stitch data producing apparatus which is also provided with a data produce/edit unit, the data storing device storing stitch data produced and edited by the data produce/edit unit.

2. Description of the Related Art

Data storing devices incorporated into word processors and personal computer systems are known in the prior art for storing produced or edited data in a storage medium, such as a floppy disk. When the remaining storage capacity of the recording medium is insufficient to store the quantity of new data by such a data storing device, unnecessary data previously stored in the storage medium must be erased before storing the new data. Some known data producing/storing devices indicate the data size of data stored in the storage medium on a display when erasing the unnecessary data.

Those data storing devices known in the prior art, however, are unable to explicitly indicate the relation between the data size of the new data to be stored and the remaining storage capacity of the storage medium. Accordingly, it has been impossible to know accurately which unnecessary data must be erased to enable writing the new data to the storage medium when the remaining storage capacity of the storage medium is insufficient for storing the new data. Consequently, in some cases, a data write command is given uselessly despite the insufficient remaining storage capacity of the storage medium. Such a useless operation reduces the efficiency of the data storing operation and the prior art data storing devices are thus inconvenient.

SUMMARY OF THE INVENTION

This invention has been made in view of the foregoing problem in the prior art and provides a data storing device capable of carrying out an easy operation for writing data to a storage medium.

Thus, the data storing device for storing data of this invention includes storing means for storing produced data, data size determining means for determining a data size of the produced data to be stored to the storing means, determining means for determining if the produced data having the data size determined by the data size determining means can be stored in the storing means, storage area determining means for determining a data size of a shortage capacity of the storing means based on the data size of the produced data determined by the determining means and a total capacity of the storing means, and display means for displaying information representing the data size of the shortage capacity of the storing means determined by the storage area determining means and information representing data size of at least one data set previously stored in the storing means.

In the data storing device of this invention, the data size determining means determines the data size of the produced data to be stored to the storing means. The determining means determines if the produced data having the data size determined by the data size determining means can be stored in said storing means. The storage area determining means determines the data size of a shortage capacity of the storing means based on the data size of the produced data determined by the determining means and the total capacity of the storing means. The display means displays the information representing the data size of the shortage capacity of the storing means determined by the storage area determining means and the information representing the data size of at least one data set previously stored in the storing means.

As is apparent from the foregoing description, when storing the produced data in the storing means, the display means of the data storing device apparatus displays information representing the data previously stored in the storing means and information representing the data size of shortage capacity necessary for storing the produced data. Therefore, the appropriate unnecessary data set or sets among the data sets previously stored in the storing means can easily be selected and erased, which facilitates and simplifies the operation for writing the produced data to the storing means.

BRIEF DESCRIPTION OF THE DRAWINGS

Preferred embodiments of the present invention will be described in detail with reference to the accompanying drawings, in which:

FIG. 6 is a perspective view of an embroidery sewing machine.

DETAILED DESCRIPTION OF THE PREFERRED EMBODIMENT

Figure 1:
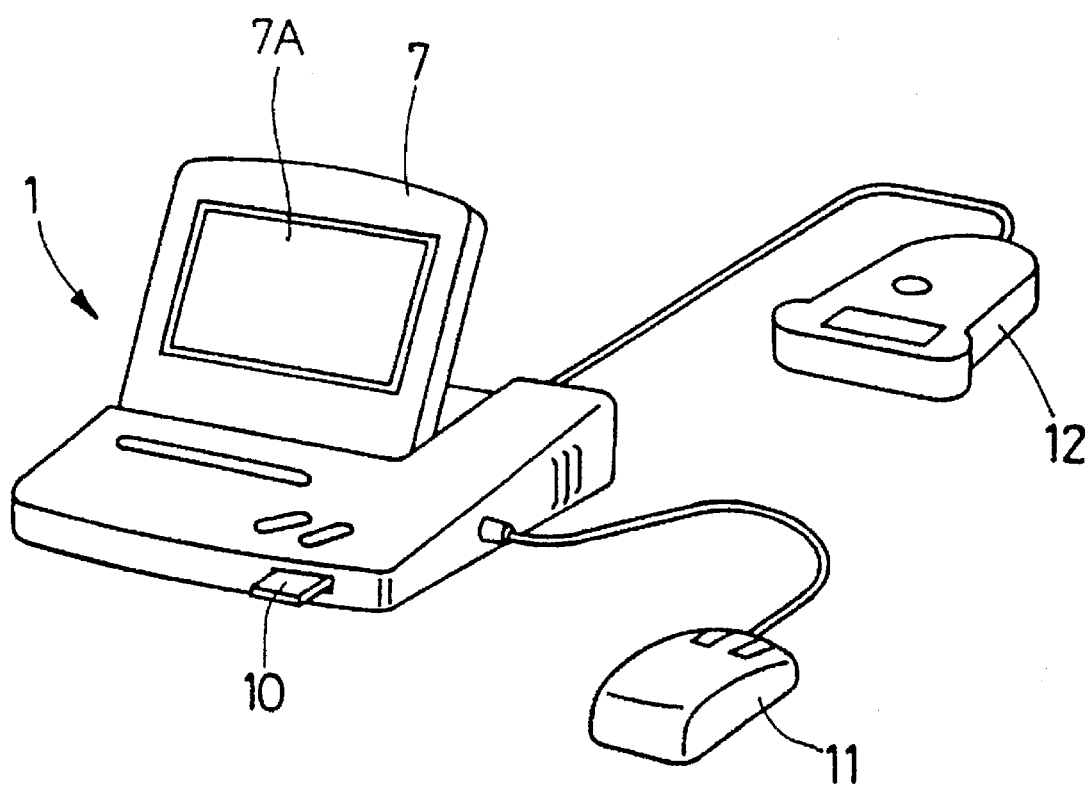
FIG. 1 is a perspective view of a preferred embodiment of a stitch data producing apparatus incorporating the data storing device of this invention.

This invention will be described as applied to a stitch data producing apparatus for producing stitch data to be used by a domestic embroidery sewing machine which incorporates the data storing device. However, it should be appreciated that the data storing device can be incorporated into a wide variety of data producing apparatus, such as image scanners, word processors, general-purpose personal computer systems and the like.

The domestic embroidery sewing machine 14 is shown in FIG. 6. The embroidery machine 14 embroiders a pattern on a workpiece held on an embroidery frame 18 by the cooperative stitching operation of a needle 22 and a hook mechanism (not shown) while the embroidery frame 18 is moved on a bed 16 by a horizontal moving mechanism 20 to given positions represented by coordinates on an orthogonal coordinate system specific to the embroidery machine 14.

During the stitching operation, a controller comprising, for example, a microcomputer, automatically controls the horizontal moving mechanism 20 and the needle 22 according to stitch data input to the embroidery machine 14. The stitch data specifies movement distances along the x-axis and the y-axis and a stitch point for each stitching cycle. The embroidery machine 14 is provided with a data read unit 24 which reads the stitch data from an external flash memory 10, such as a card memory, loaded into the data read unit 24. A stitch data producing apparatus, which will be described later, produces the stitch data input to the data read unit 24.

Figure 2:
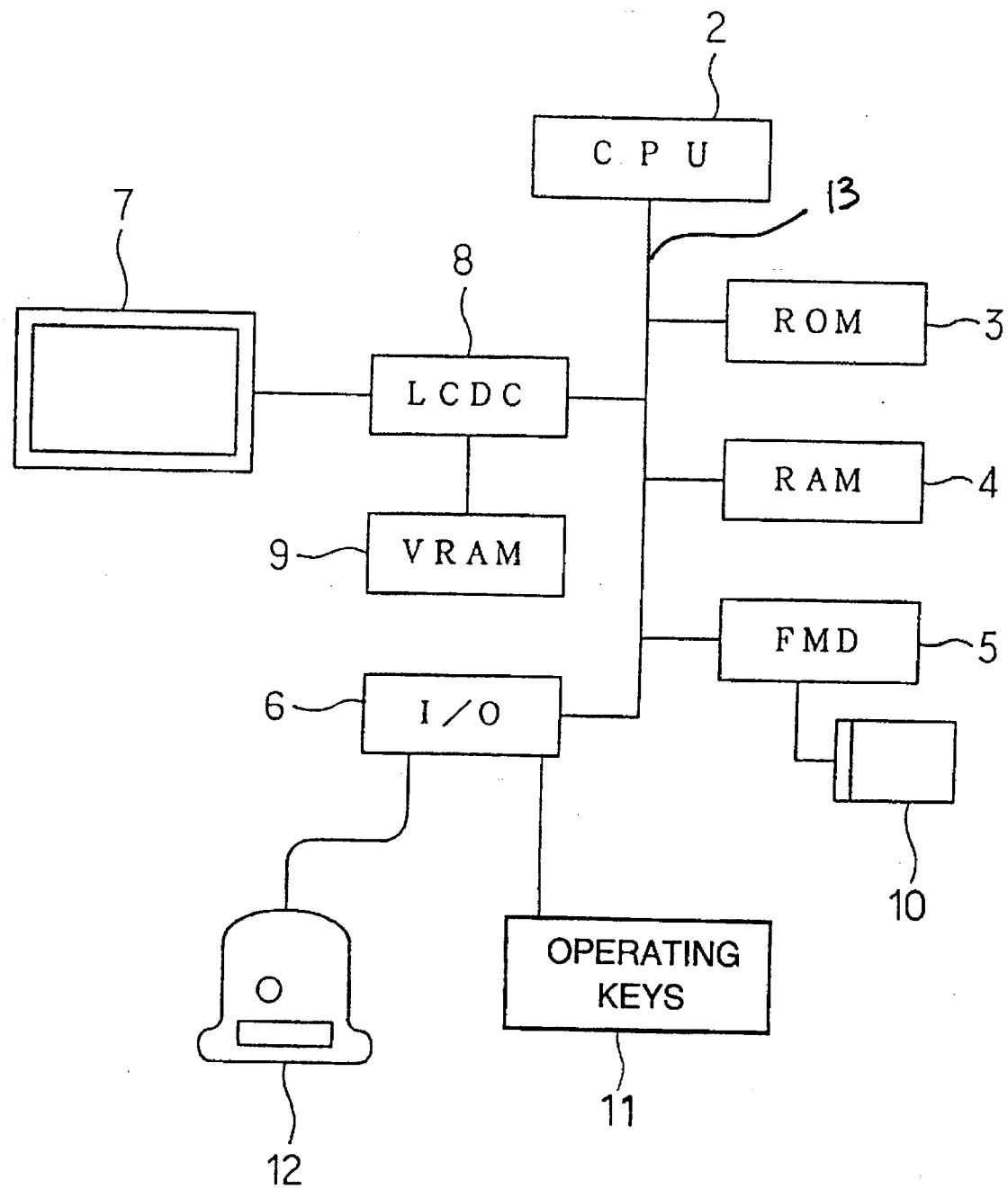
FIG. 2 is a block diagram of the control system of the stitch data producing apparatus of FIG. 1.

A preferred embodiment of the stitch data producing apparatus I is shown in FIGS. 1 and 2, which show the external appearance and the control system, respectively, of the stitch data producing apparatus 1. The stitch data producing apparatus 1 includes, as shown in FIG. 2, a microcomputer comprising a CPU 2, a ROM 3, a RAM 4, a flash memory device (FMD) 5, an input/output (I/O) interface 6, and a bus 13 interconnecting these components. A program for performing a stitch data storing procedure is stored in the ROM 3.

Figure 3:
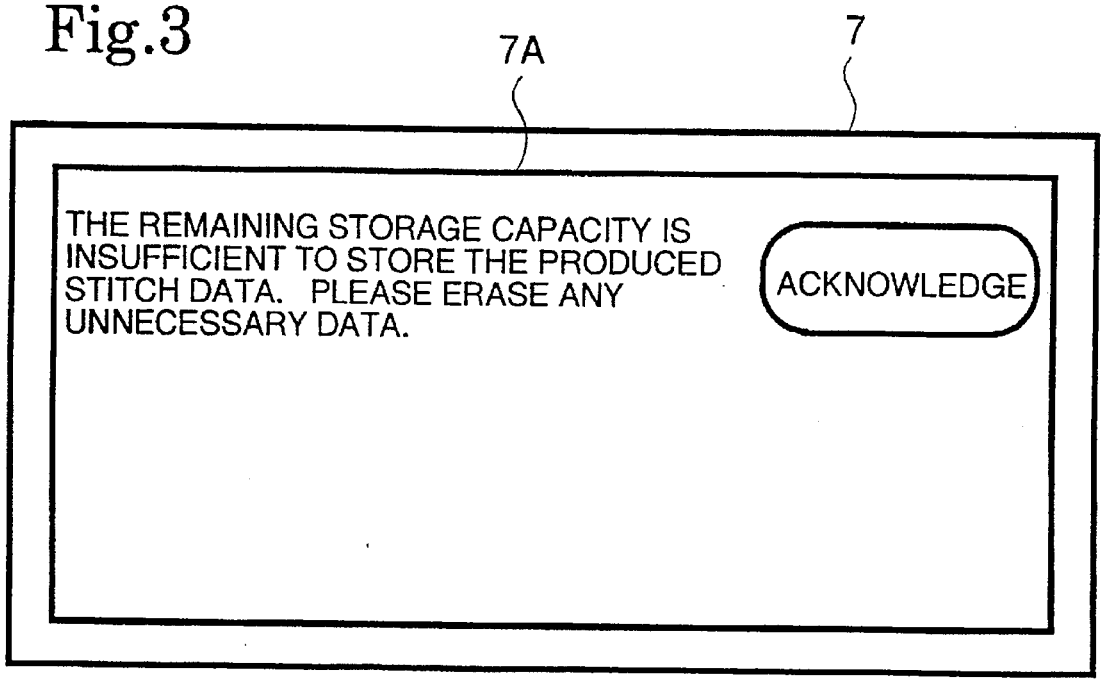
FIG. 3 is a view of the screen of a liquid crystal display of the stitch data producing apparatus of FIG. 1.
Figure 4:
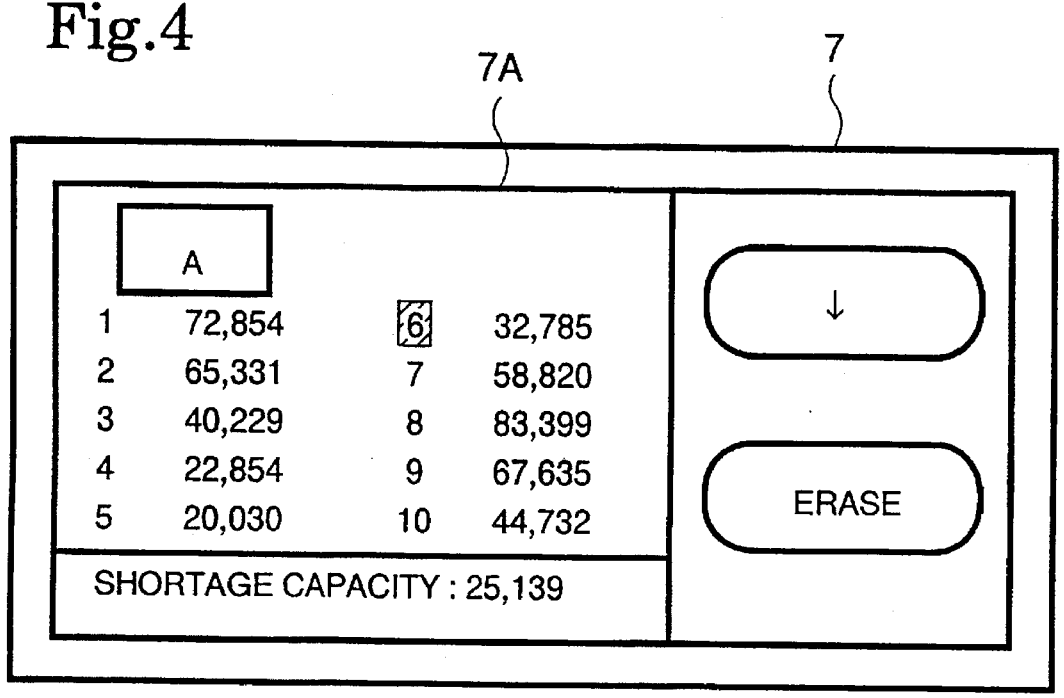
FIG. 4 is an illustration of the information displayed on the screen of the liquid crystal display.

A liquid crystal display (LCD) 7 is installed on the upper wall of the stitch data producing apparatus 1, and includes a screen 7A to display data stored in the flash card memory 10 and messages, as shown in FIGS. 3 and 4. The liquid crystal display 7 is controlled by a liquid crystal display controller (LCDC) 8. A display data storage device (VRAM) 9 is connected to the liquid crystal display controller 8. The flash card memory 10 is detachably loaded into the flash memory device (FMD) 5. The stitch data producing apparatus 1 is provided with operating keys 11 for controlling the CPU 2 to select tasks and to input instructions. Switches operated by the operating keys 11 are connected through the I/O interface 6 to the CPU 2.

A binary image scanner 12 for scanning an original picture of an embroidery pattern to obtain pattern image data is connected to the I/O interface 6 of the stitch data producing apparatus 1. Pattern image data obtained by the image scanner 12 indicates each pixel by a binary density value "0" or "1" and is stored in the RAM 4. Stitch data for controlling the embroidery machine 14 is created on the basis of the pattern image data and is written to the flash card memory 10.

Figure 5:
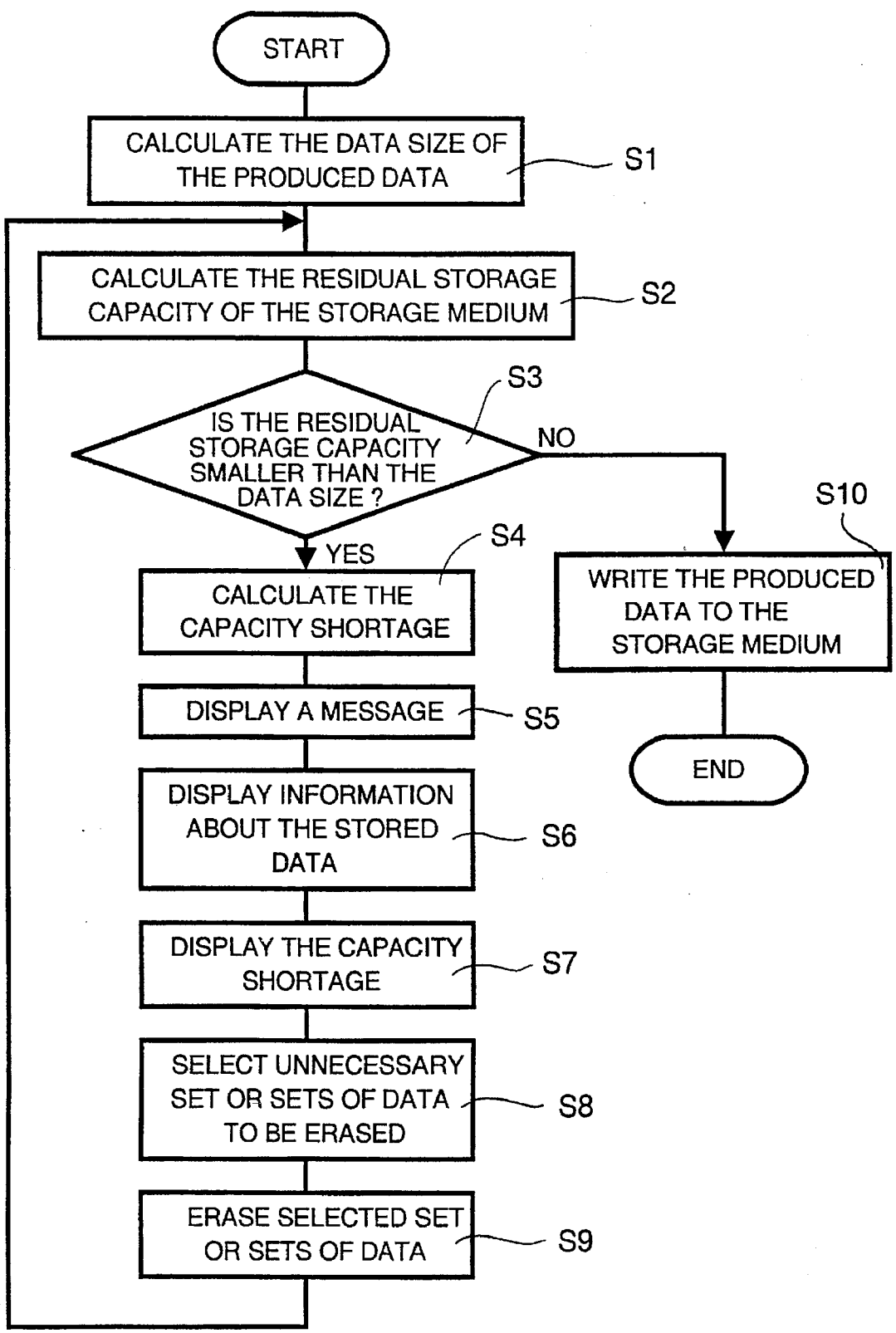
FIG. 5 is a flow chart of a data storage procedure carried out by the stitch data producing apparatus of FIG. 1.

A data storage procedure carried out by the stitch data storage apparatus 1 is outlined by the flowchart shown in FIG. 5. The following description assumes that the data size of the produced stitch data to be stored in the flash card memory 10 is 28,400 bytes (27.73 kbytes), the total storage capacity of the flash memory card 10 is 512,000 bytes (500 kbytes) and ten sets of stitch data, having a total data size of 486,861 bytes (475.45 kbytes), have already been stored in the flash card memory 10.

Once a stitch data write request is entered by operating the operating key 11, the program for controlling the stitch data storing procedure stored in the ROM 3 is started and continues to step S1. In step S1, the data size of the produced stitch data specified by the stitch data write request (e.g., 28,400 bytes) is determined. In step S2, the remaining storage capacity of the flash card memory 10 is determined. First, the sum of the respective data sizes of the ten sets of stitch data previously stored in the flash card memory 10, (e.g., 486,861 bytes,) is subtracted from the total storage capacity (e.g., 512,000 bytes) of the flash card memory 10. In this example, the remaining storage capacity of the flash card memory 10 is 25,139 bytes (24.55 kbytes). In step S3, the data size of the produced stitch data to be written to the flash card memory 10 is compared against the remaining storage capacity of the flash card memory 10 to determine whether the remaining storage capacity is smaller than the data size of the produced stitch data. If the remaining storage capacity of the flash card memory 10 is smaller than the data size of the produced stitch data, control continues to step S4. Otherwise, control jumps to step S10. Since, in this example, the remaining storage capacity of the flash card memory 10 is smaller than the data size of the produced stitch data, the response to the query in step S3 is affirmative, and control continues to step S4.

The shortage capacity is the amount of storage capacity needed in the flash card memory 10 in addition to the remaining storage capacity so that the produced stitch data can be stored in the flash card memory 10. That is, $PD \leq RSC+SC$, where PD is the amount of produced data, in bytes, RCS is the amount of remaining storage capacity, in bytes, and SC is the amount of shortage capacity, in bytes. In step S4, the shortage capacity is determined. In this preferred embodiment, the shortage capacity is determined by subtracting the data size of the produced stitch data from the remaining storage capacity. That is, $-SC \leq RSC-PD$. Therefore, the shortage capacity is a negative value.

In step S5, a message, as shown in FIG. 3, is output to the display 7 to inform the operator that the remaining storage capacity is insufficient to store the produced stitch data and to prompt the operator to erase one or more unnecessary sets of the previously stored stitch data. This message is displayed on the screen 7A of the liquid crystal display 7. Then, the operator depresses the relevant one of the operating keys 11 to acknowledge the message. Next, in step S6, information, which includes the names and the sizes of the sets of stitch data previously stored in the flash memory card 10, as shown in FIG. 4, is displayed on the screen 7A of the liquid crystal display 7. Then, in step S7, the determined shortage capacity is displayed in addition to the information on the screen 7A of the liquid crystal display 7. It should be appreciated that the stitch data producing apparatus, when acting as the data storing device uses the conventional, known techniques for memory resource management to determine the data size of the produced data set, the data size of the previously stored data sets, and the shortage capacity.

In this state, the functions of the operating keys 11, the respective data sizes of the sets of previously stored stitch data, and the absolute value of the determined shortage are displayed, respectively, in the right-hand section, in the central section and the lower section of the screen 7A. It should also be appreciated that the stitch data producing apparatus I can control the LCD 7 to sequentially display the determined shortage capacity and the data sizes of the sets of previously stored stitch data, instead of simultaneously displaying the determined shortage capacity and the data sizes of the sets of previously stored stitch data on the LCD 7, as shown in FIG. 4.

In FIG. 4, the reference number "6" of the set of stitch data having a data size which is the smallest of those equal to or greater than the shortage capacity is displayed in inverted form to facilitate the selection of the set of stored stitch data to be erased to secure sufficient remaining storage capacity to store the produced stitch data. The symbol or shape represented by the highlighted set of stitch data is displayed in the upper right hand corner of the screen 7A. Thus, a character "A" displayed in the upper right-hand corner of the screen 7A indicates that the selected set of stitch data is for stitching a pattern "A".

In step S8, the stitch data to be erased is selected by referring to the information about the stored stitch data and the shortage capacity displayed on the screen 7A. When selecting the stitch data to be erased, the operating key 11, which is specified by a move function indicated by an arrow and displayed on the screen 7A, is depressed to position an inverted cursor on the reference number of the selected set of stitch data to be erased. Then, the operating key 11, which is specified by an erase function displayed on the screen 7A, is depressed to erase the selected set of stitch data.

In step S9, the selected set of stitch data is erased from the flash card memory 10. Then, the stitch data storing procedure returns to step S2 to again determine the remaining storage capacity of the flash card memory 10. The determined remaining storage capacity is thus again compared with the data size of the produced stitch data in step S3. If the remaining storage capacity is again smaller than the data size of the produced stitch data, steps S4 through S9 are re-executed. However, if the remaining storage capacity of the flash card memory 10 is now sufficient to store the produced stitch data, the produced stitch data is written to the flash card memory 10 in step S10. Then, the stitch data storing procedure ends.

Simultaneous display of the information, including the sizes of the previously stored sets of stitch data, and the shortage capacity necessary to store the produced stitch data on the screen 7A, as shown in FIG. 4, facilitates the selection and erasing of one or more sets of stitch data to secure a sufficient remaining storage capacity. Therefore, the produced stitch data can be written to the flash card memory 10 by a simple write operation.

Although only the reference number of the set of stitch data having the smallest data size sufficient for making up for the capacity shortage is indicated by an inverted character on the screen 7A shown in FIG. 4 in the described example, the reference numbers of a plurality of the sets of stitch data, where the sum of the respective data sizes at least equal to the shortage capacity, may be indicated by inverted characters, if the shortage capacity is greater than any single set of stitch data. For example, the reference number 4 and 5 of the fourth and the fifth set of stitch data whose sum of their data sizes is greater than the shortage capacity, may be indicated by inverted characters to assist the operator in selecting the one or more sets of stitch data to be erased.

Furthermore, the reference numbers, the designations and the respective data sizes of each set of stitch data which has a data size at least equal to the shortage capacity may be underscored. Identifiers identifying the oldest set of stitch data and/or the least frequently used set of stitch data may also be stored in the flash card memory 10. These identifiers may be used, in addition to the data size, as a basis for determining the set of stitch data to be indicated in the first place by the inverted character. The selection of one or more sets of stitch data to be erased will further be simplified when the sets of stitch data stored in the flash card memory 10 are displayed in order of data size.

One means for executing step S1 corresponds to the data size determining means of the data storing device incorporated into the stitch data producing apparatus of this invention. One means for executing step S2 corresponds to the remaining storage capacity determining means. One means for executing step S3 corresponds to a decision means. The liquid crystal display 7 and one means for executing step S7 correspond to the stored data information display means. While the functions of the data storage device have been incorporated into, and combined with, the stitch data producing functions of the stitch data producing apparatus 1, it should be appreciated that the data storing device can be incorporated into a variety of devices, or provided as an independent device.

Since the described preferred embodiment displays, if the remaining storage capacity is smaller than the data size of the produced stitch data to be stored, the shortage capacity together with the respective data sizes of the previously stored sets of stitch data, one or more sets of stitch data to be erased can be readily recognized. That is, the operator need not calculate the shortage capacity when writing the produced stitch data, which improves the operability of the data storing device remarkably.

Since the shortage capacity is visually recognized, the unnecessary stitch data erasing operation can be repeated again immediately after erasing one unnecessary stitch data yet having a data size less than the shortage capacity. Therefore, a remaining storage capacity sufficient to store the produced stitch data can quickly be obtained. Since the set of stitch data having the smallest data size at least equal to the shortage capacity can be automatically selected, the set of previously stored stitch data to be erased to obtain the sufficient remaining storage capacity can be simply determined.

Although the described preferred embodiment displays the shortage capacity shortage of the flash card memory 10, the data size of the produced stitch data may be displayed together with the respective data sizes of the stored sets of stitch data to determined one or more sets of previously stored stitch data to be erased through comparison of the data size of the produced stitch data with the data sizes of the sets of previously stored stitch data. Comparative attributes, such as "Greater", "Smaller", and "Equal", of the respective data sizes of the previously stored sets of stitch data, relative to the data size of the produced stitch data, may be displayed in addition to or instead of the respective data sizes of the previously stored sets of stitch data.

This invention is not limited in its practical application to the preferred embodiment specifically described above. This invention is applicable to the data storing devices of word processors, general-purpose personal computer systems and the like and changes and variations may be made therein without departing from the scope and spirit of the claimed invention.

What is claimed is:

1. A stitch data producing apparatus for producing data, comprising:

storing means for storing a produced data set;

data size determining means for determining a data size of the produced data set to be stored in said storing means;

storage determining means for determining if the produced data set can be stored in said storing means based on the determined data size;

storage area determining means for determining, when the produced data set cannot be stored in said storing means, a size of a shortage capacity of said storing means based on the determined data size of the produced data set, a used capacity of said storing means and a total capacity of said storing means; and display means for displaying information representing the determined size of the shortage capacity and a data size of at least one data set previously stored in said storing means.

2. The stitch data producing apparatus of claim 1, further comprising:

remaining storage capacity determining means for determining a remaining storage capacity of said storing means; and comparing means for comparing the data size of the produced data set against the determined remaining storage capacity;

wherein said storage determining means determines if the remaining storage capacity of the storing means is sufficient to store the produced data set based on the results output by the comparing means.

3. The stitch data producing apparatus of claim 2, further comprising:

age determining means for determining an oldest one of the at least one previously stored data set; and oldest set data size determining means for determining a data size of the oldest set of previously stored data;

wherein said storage determining means determines whether a sum of the remaining storage capacity and the data size of the oldest previously stored data set is sufficient to store the produced data set.

4. The stitch data producing apparatus of claim 2, further comprising:

use determining means for determining a frequency of use of the at least one previously stored data set;

least used selecting means for identifying a least used one of the at least one previously stored data set; and least used data size determining means for determining a data size of the least used set of previously stored data;

wherein said storage determining means determines whether a sum of the remaining storage capacity and the data size of the identified least used previously stored data set is sufficient to store the produced data set.

5. The stitch data producing apparatus of claim 2, further comprising:

data set size determining means for determining which ones of the previously stored data sets have a data size equal to or greater than the shortage capacity; and data set selection means for selecting one of the determined previously stored data sets determined by the data set size determining means having a smallest data size, wherein the sum of the remaining storage capacity and the data size of the selected previously stored data set is sufficient to store the produced data set.

6. The stitch data producing apparatus of claim 1, further comprising:

selecting means for selecting at least one data set previously stored in said storing means; and erasing means for deleting from said storing means said selected at least one data set previously stored in said storing means;

wherein, as a result of deleting said selected at least one data set previously stored in said storing means, the produced data set is stored in the storing means.

7. A data storing device for storing a produced data set, comprising:

storing means for storing the produced data set;

data size determining means for determining a data size of the produced data set to be stored to said storing means;

storage determining means for determining if the produced data set having the data size determined by said data size determining means can be stored in said storing means;

storage area determining means for determining, when the produced data set cannot be stored in said storing means, a data size of a shortage capacity of said storing means based on the data size of the produced data set determined by said determining means, a used capacity of said storing means and a total capacity of said storing means; and display means for displaying information representing the data size of the shortage capacity of said storing means determined by said storage area determining means and information representing a data size of at least one data set previously stored in said storing means.

8. The data storing device of claim 7, further comprising:

remaining storage capacity determining means for determining a remaining storage capacity of said storing means for storing the produced data set; and comparing means for comparing the data size of the produced data set with the determined remaining storage capacity;

wherein said storage determining means determines if the remaining storage capacity of the storing means is sufficient to store the produced data set.

9. The data storing device of claim 8, further comprising age determining means for determining an oldest one of the at least one previously stored data set; and oldest set data size determining means for determining a data size of the oldest set of previously stored data;

wherein said storage determining means determines whether a sum of the remaining storage capacity and the data size of the oldest previously stored data set as sufficient to store the produced data set.

10. The data storing device of claim 8, further comprising:

use determining means for determining a frequency of use of the at least one previously stored data set;

least used selecting means for identifying a least used one of the at least one previously stored data set; and least used data size determining means for determining a data size of the least used set of previously stored data;

wherein said storage determining means determines whether a sum of the remaining storage capacity and the data size of the identified least used previously stored data set is sufficient to store the produced data set.

11. The data storing device of claim 8, further comprising:

data set size determining means for determining which ones of the previously stored data sets have a data size equal to or greater than the shortage capacity; and data set selection means for selecting one of the determined previously stored data sets determined by the data set size determining means having a smallest data size, wherein the sum of the remaining storage capacity and the data size of the selected previously stored data set is sufficient to store the produced data set.

12. The data storing device of claim 7, wherein the data storing device is provided in a stitch data producing apparatus for producing stitch data for controlling a sewing machine.

13. The data storing device of claim 7, further comprising:

selecting means for selecting at least one data set previously stored in said storing means; and erasing means for deleting from said storing means said selected at least one data set previously stored in said storing means;

wherein, as a result of deleting said selected at least one data set previously stored in said storing means, the produced data set is stored in the storing means.

14. A data storing apparatus for storing a produced data set, comprising:

a storing device storing the produced data set;

a data size determining circuit determining a data size of the produced data set to be stored in said storing device;

a storage determining circuit determining if the determined data size of the produced data set can be stored in said storing device;

a storage area determining circuit determining, when the produced data set cannot be stored in said storing device, a data size of a shortage capacity of said storing device based on the determined data size of the produced data set, a used capacity of said storing device and a total capacity of said storing device; and a display device for displaying information representing the determined data size of the shortage capacity of said storing device and a data size of at least one data set previously stored in said storing device.

15. The data storing apparatus of claim 14, further comprising:
- a remaining storage capacity determining circuit determining a remaining storage capacity of said storing device; and
- a comparing circuit comparing the data size of the produced data set against the determined remaining storage capacity;
- wherein said storage determining circuit determines if the remaining storage capacity of the storing means is sufficient to store the produced data.

16. The data storing apparatus of claim 15, further comprising:
- an age determining circuit determining an oldest one of the at least one previously stored data set; and
- an oldest set data size determining circuit determining a data size of the oldest set of previously stored data;
- wherein said storage determining circuit determines whether a sum of the remaining storage capacity and the data size of the oldest previously stored data set is sufficient to store the produced data set.

17. The data storing apparatus of claim 15, further comprising:
- a use determining circuit determining a frequency of use of the at least one previously stored data set;
- a least used selecting circuit identifying a least used one of the at least one previously stored data set; and
- a least used data size determining circuit determining a data size of the least used set of previously stored data;
- wherein said storage determining circuit determines whether a sum of the remaining storage capacity and the data size of the identified least used previously stored data set is sufficient to store the produced data set.

18. The data storing apparatus of claim 15, further comprising:
- data set size determining means for determining which ones of the previously stored data sets have a data size equal to or greater than the shortage capacity; and
- data set selection means for selecting one of the determined previously stored data sets determined by the data set size determining means having a smallest data size, wherein the sum of the remaining storage capacity and the data size of the selected previously stored data set is sufficient to store the produced data set.

19. The data storing apparatus of claim 14, wherein the data storing apparatus is provided in a stitch data producing apparatus for producing stitch data for controlling a sewing machine.

20. The data storing apparatus of claim 14, further comprising:
- a selection circuit through which an operator of the data storing device selects at least one data set previously stored in said storing device; and
- a deletion circuit which deletes from said storing device said selected at least one data set previously stored in said storing device;
- wherein, as a result of deleting said selected at least one data set previously stored in said storing device, the produced data set is stored in the storing device.

21. The data storing apparatus of claim 14, further comprising:
- a selection circuit which selects at least one data set previously stored in said storing device; and
- a deletion circuit which deletes from said storing device said selected at least one data set previously stored in said storing device;
- wherein, as a result of deleting said selected at least one data set previously stored in said storing device, the produced data set is stored in the storing device.

22. A method for storing a produced data set, comprising:
- determining a data size of the produced data set to be stored to a storing means;
- determining if the produced data set having the determined data size can be stored in said storing means;
- determining, when the produced data set cannot be stored in said storing means, a data size of a shortage capacity of said storing means based on the data size of the produced data, a used capacity of said storing means and a total capacity of said storing means; and
- displaying information representing the data size of the shortage capacity of said storing means and information representing a data size of at least one data set previously stored in said storing means.

23. The method of claim 22, further comprising:
- determining a remaining storage capacity of said storing means;
- comparing the data size of the produced data set with the determined remaining storage capacity; and
- determining if the remaining storage capacity of the storing means is sufficient to store the produced data.

24. The method of claim 23, further comprising:
- determining which ones of the previously stored data sets have a data size greater than the shortage capacity; and
- selecting one of the determined previously stored data sets determined by the data set size determining means having a smallest data size, wherein the sum of the remaining storage capacity and the data size of the selected previously stored data set is sufficient to store the produced data set.

25. The method of claim 22, further comprising:
- selecting at least one data set previously stored in said storing means;
- deleting from said storing means said selected at least one data set previously stored in said storing means; and
- storing the produced data set in the storing means.

* * * * *